Dec. 26, 1939.　　　B. L. CONLEY　　　2,184,411
ELECTRIC MOTOR SWITCH
Filed Oct. 30, 1935　　　2 Sheets-Sheet 1

INVENTOR
*Brooks L. Conley*
BY
*Harry S. Dumarse*
ATTORNEY

Dec. 26, 1939.     B. L. CONLEY     2,184,411
ELECTRIC MOTOR SWITCH
Filed Oct. 30, 1935     2 Sheets-Sheet 2

INVENTOR
Brooks L. Conley
BY Harry S. Demarse
ATTORNEY

Patented Dec. 26, 1939

2,184,411

UNITED STATES PATENT OFFICE 2,184,411

ELECTRIC MOTOR SWITCH

Brooks L. Conley, Jersey City, N. J., assignor of one-half to Frederick S. Kingston, Jersey City, N. J.

Application October 30, 1935, Serial No. 47,374

2 Claims. (Cl. 200—80)

The present invention relates to electrical motors in general and more particularly to centrifugal switches for electric motors. More specifically the invention comprises a centrifugally operated switch which operates with a snap action upon the electric motor attaining a critical speed of rotation for the purpose of varying the electric circuit of the motor, and which holds its new position until the motor speed has decreased to a point below the original throw-out speed.

It is an object of the present invention to provide a new and improved centrifugal switch for electric motors or generators. It is another object of the invention to provide an electric motor centrifugal switch in which there is a delayed action to permit the centrifugally operated part to accelerate before actuating the current-controlling part of the switch. Another object is to provide a centrifugal switch for electric motors in which the motor speed at which the switch operates in the acceleration of the motor is greater than the speed at which it operates in the deceleration of the motor. A still further object of the invention is to provide a new and novel centrifugal switch for electric motors in which there is no fluttering action of the movable contact. These and other more specific objects will become apparent upon reading the following specification and claims and upon considering in connection therewith the attached drawings to which they relate.

Referring now to the drawings, in which the same reference characters refer to the same parts throughout:

Figure 8:
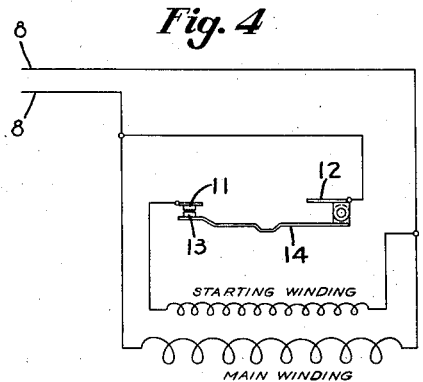
Figure 8 is a diagrammatic showing of the motor circuit which the switch constructed in accordance with the present invention is adapted to operate.
Figure 6:
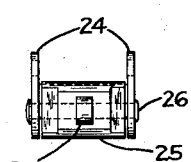
Figure 6 is a view of a centrifugal weight per se and its mounting cradle.
Figure 7:
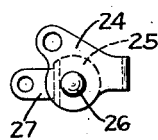
Figure 7 is a view at right angles to Figure 6.

In the drawings is illustrated an electric motor comprising a stator which includes a frame or casing 1 and a field 2, and a rotor 3. The end walls or plates 4 of the casing 1 are formed to provide a bearing housing 5 within which is positioned a bearing 6. The rotor 3 includes a through supporting shaft 7 which is rotatably mounted at each end of the casing within a bearing 6. Incoming power leads 8, 8, enter the casing 1 and are connected to the stator, the exact electrical circuit of the motor being unimportant. In Figure 8 of the drawings a typical circuit is illustrated in which the leads 8, 8 are connected to the main winding of the stator and to a starting winding in parallel therewith, the starting winding being provided with a switch in its circuit. It is in this switch that the present invention resides.

The centrifugal switch constructed in accordance with the present invention may be divided roughly into two parts. The first part is the non-rotating stationary frame-mounted part, and the second part is the rotating or rotor-carried part. The contacts which open and close the electrical circuit are both included in the frame-carried part of the switch constructed in accordance with the present invention, while the actuating mechanism comprises the rotor-carried parts.

Figure 3:
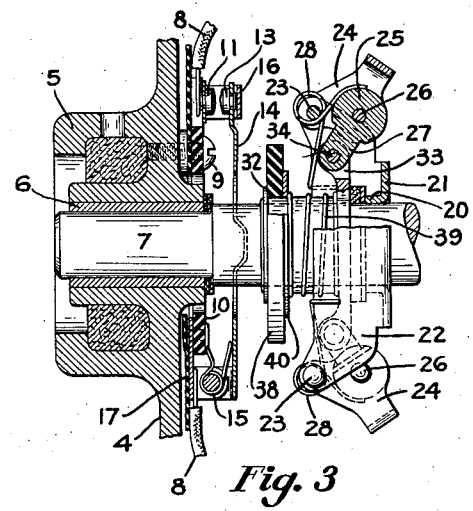
Figure 3 is a view similar to Figure 2 but with the switch in the motor-running position.
Figure 4:
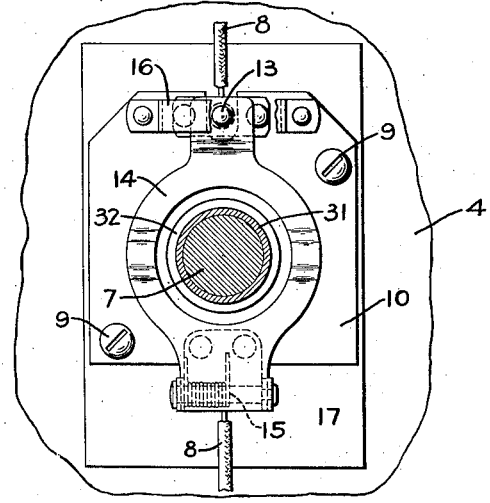
Figure 4 is a section upon the line 4—4 showing the parts of the switch carried by the motor stator and specifically by the end wall of the motor frame.
Figure 5:
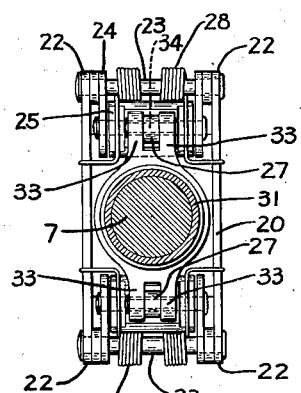
Figure 5 is a section upon the line 5—5 of Figure 2, showing the centrifugal weights and connected parts.

The stationary part of the present switch, that part carried by the end wall of the motor casing, comprises a supporting plate 10 of insulating material which is secured to the inner face of the end wall of the motor casing as by screws 9, 9, a sheet of insulating paper 17 being positioned between the plate and the end wall and extended at the sides of the former. Plate 10 extends around the motor shaft 7 and its supporting bearing 6, as clearly illustrated in Figure 4. At one side of the motor shaft 7 a stationary contact 11 is carried by the plate 10, a current-carrying lead 8 being connected thereto. At a point spaced from the contact 11, preferably diametrically spaced across shaft 7 therefrom, is a bracket 12 to which a second current-carrying lead 8 is connected, and which forms the pivotal mounting for the moving contact 13 which includes a supporting arm 14, which encircles shaft 11. A coil spring 15 at the pivot point of contact 13 urges that contact from the stationary contact 11 while a stop or movement-limiting member 16 extends around both contacts and limits the pivotal movement of contact 13. Movable contact 13 is adapted to contact stationary contact 11 in a closed position, as illustrated in Figure 2, or to pivot therefrom to an open position, as illustrated in Figure 3.

The rotating part of the switch mechanism, comprising that part mounted upon the rotor which functions to actuate the movable contact 13, comprises a frame 20 formed with a central seat portion 21 which seats upon shaft 7 in non-rotatable relationship thereto and which is formed with diametrically spaced pairs of arms 22, 22, the arms of each pair being connected at their outer ends by a pin 23. A U-shaped cradle 24 pivots upon each pin 23 with its side arms positioned immediately inside of the side arms 22, 22 of the frame. The central portion of each cradle rests in its innermost position upon the central portion of frame 20, as shown in Figure 2, but is adapted to pivot about pin 23 to an outermost position, as illustrated in Figure 3.

Figure 1:
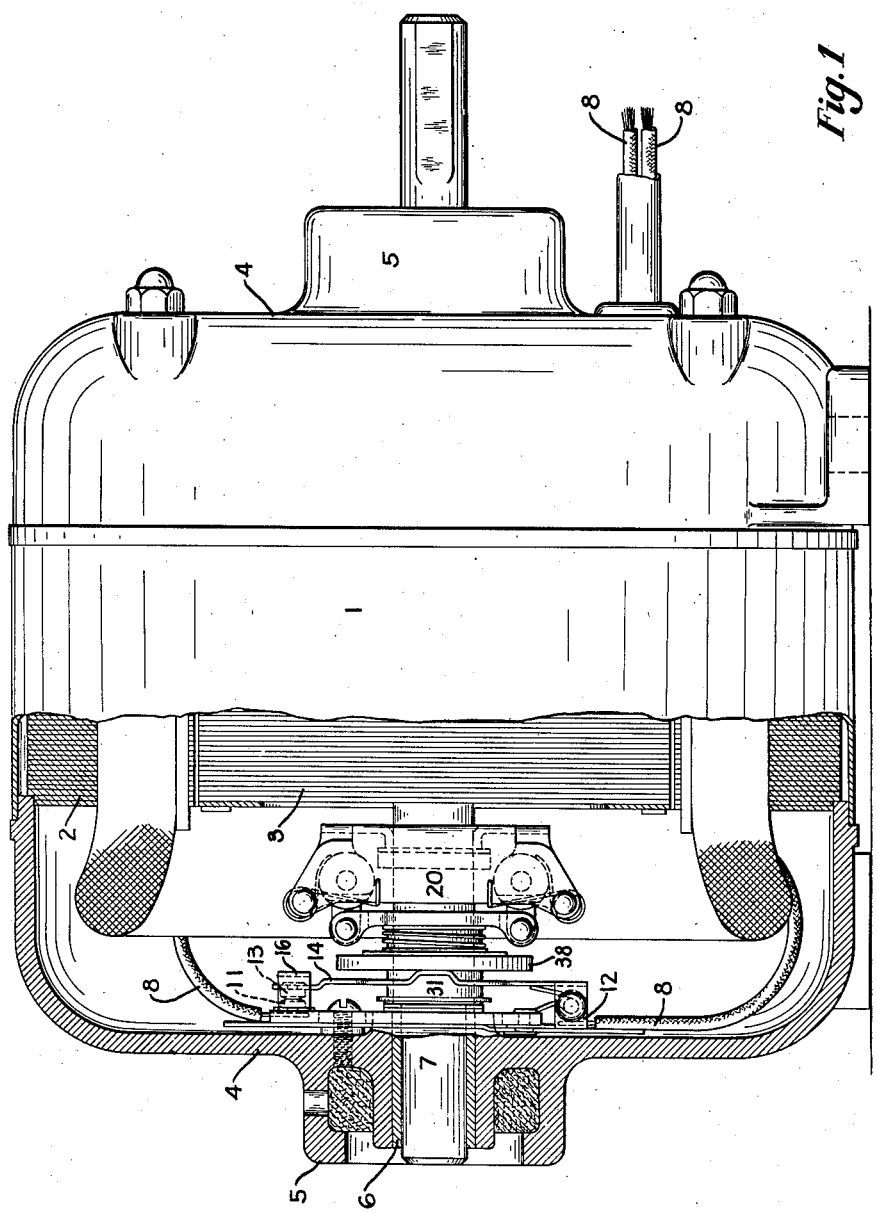
Figure 1 is a side elevation of an electric motor embodying a centrifugal switch constructed in accordance with the present invention, certain parts being broken away to show the switch positioned therein.
Figure 2:
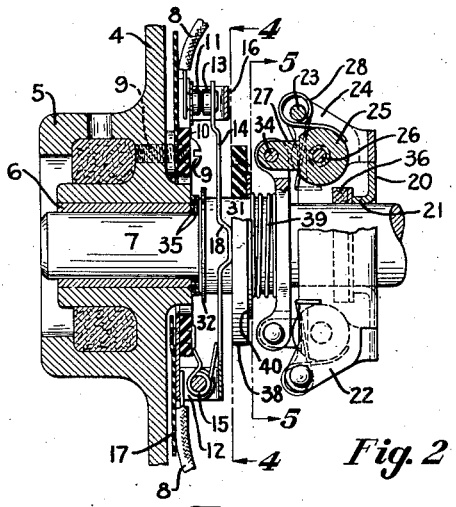
Figure 2 is a longitudinal section through the centrifugal switch in its motor-standing position.

A centrifugal weight 25 is mounted upon each cradle 24 radially within the pivot point of the cradle, as represented by the pin 23, and axially spaced therefrom, reference being had to shaft 7, at a slight distance when the cradle is in its innermost radial position, as illustrated in Figure 2. Each weight 25 is rotatably mounted upon its cradle by a pin 26 and is formed with an arm 27 which extends radially from the pin which represents the center of mass of the weight. A coil spring 28 encircles the pivot pin 23 of each cradle 24 with its outer extremities turned at right angles and lying against the sides of frame 20 and with a central projecting portion overlying and contacting the weight 25 to urge it and the cradle radially inward to the inner position shown in Figure 2. The outward radial movement of a weight 25, together with its carrying cradle 24, takes place against the opposition of the spring 28.

A sleeve 31 is slidable upon the shaft 7 between frame 20 and the adjacent end of the motor casing. This sleeve is formed with an outer flange 32 and with radially extending, diametrically opposed pairs of arms 33, 33 defining its inner end. The projecting arm 27 of each weight 25 extends between the arms of a pair of arms 33, 33 and is pivoted relative thereto by a pivot pin 34 so that upon the pivotal movement of the weight 25 about the cradle-supporting pin 23 as an axis the sleeve 31 will be moved upon the shaft 7. To prevent and eliminate all possibility of contact of sliding sleeve 31 with either the end wall 4 of the motor casing or with the seat portion 21 of frame 20 there are provided non-metallic washers 35, 35 between the outer end of sleeve 31 and the adjacent end wall, and a felt ring 36, formed preferably with a metallic side adjacent frame 20, upon the inner side of the sleeve. Contact of sleeve 31 with the sound insulating means at either of its ends limits its movement while at the same time eliminating noisy metal-to-metal contact.

A collar 38 of insulating material seats and slides upon sleeve 31 between the limits defined by the flange 32 and the arms 33, 33. A coil spring 39, which is carried by and encircles sleeve 31 upon the inner side of collar 38 and uses the inner end of sleeve 31 as a seat, urges the insulating collar outwardly or toward the stationary part, and an intermediate washer 40 of metal is preferably interposed between the collar 38 and the spring to permit the free rotation of collar 38, if necessary, relative to the sleeve and to the spring. Collar 38, which is the contact-actuator, is at all times urged by spring 39 toward the adjacent end wall of the motor and more specifically into contact with its arm 14 which is formed with raised shoulders 18, 18 at the sides of shaft 7 to receive the contact of the collar 38 under the urging of spring 39. The position of the switch parts with the motor standing, that is not rotating, is as illustrated in Figure 2. Under the force exerted by the weight-actuating spring 28, 28 each weight 25 is pivoted to its innermost position with its cradle 24 resting upon the limiting shoulders of body 20 of the frame. Sleeve 31 is positioned with its outer flanged end through the shaft-enclosing opening in contact-carrying arm 14 and insulating collar 38, under the actuation of coil spring 39, holds contact 13 to stationary contact 11, having overcome the opposition of the arm-actuating spring 15 which tends to hold the two contacts apart. The combined force exerted by weight-actuating springs 28, 28 is sufficient to hold the sleeve in the stated position.

Upon the closing of the motor switch it is obvious that current will pass through the leads 8, 8 in series with the contacts 11 and 13. As the motor speed increases a critical speed is reached at which the centrifugal force exerted by each weight 25, the two weights cooperating at all times being duplicates in every respect, acting through an initial lever arm represented by the actual distance between the center of pivot pin 23 of cradle 24 and the center of pin 26 of each weight, creates a moment sufficiently great to overcome the force exerted by coil spring 28, 28 and the weights begin to move outwardly with their supporting cradles. Once the outward movement has begun the axial distance separating centers of pivotal axis 23 and pin 26 grows greater, and without any further increase in motor speed the moment likewise increases so that once begun the outward movement continues until the weights and their supporting cradles have reached their outermost positions. As the weights are connected to the sleeve 31 their outward movement has functioned to draw the sleeve axially inward and from the position illustrated in Figure 2 to that shown in Figure 3. Following an initial independent movement of the sleeve the flange 32 has contacted the insulating collar 38 and has moved it axially inward from the contact arm 14 to permit the contact-actuating spring 15 to move that arm and so the movable contact 13 to the open position. The circuit through these two contacts would thereupon be opened.

The initial movement of sleeve 31 as the weights move outwardly results in no movement of the movable contact for the sleeve flange 32 must travel from its position illustrated in Figure 2 axially inwardly on the shaft until it contacts the outer side of collar 38. This delay permits the outwardly moving centrifugal weights to accelerate so that by the time flange 32 has moved into contact with collar 38 the speed of movement of this sleeve is substantially its maximum and the lever arm of the weights around their pivotal axes has become greatly increased. This delayed action prevents absolutely all "fluttering", a term descriptive of a continuing action characterized by a partial opening immediately followed by closing.

The centrifugal weights 25, 25 having moved to their outermost positions, as illustrated in Fig. 3, the speed of the motor can retard below the point at which the switch initially operated during the acceleration of the motor without contact 13 again moving into contact with stationary contact 11. This is true because the lever arm of each weight 25 about its pivot point 23, and accordingly the movement opposing the springs 28, 28, is greater than it was with the switch in the starting position. Reference to the axial distances between the center lines of pins 23 and 26 in Figures 2 and 3, respectively, will illustrate this fact.

The embodiment described and illustrated is a preferred form of the invention, but the scope of the invention is not to be taken as limited thereto except as specified in the following claims.

I claim:

1. In a centrifugal switch construction, a rotatable unit adapted to be mounted upon a rotatable shaft at one side of the armature and comprising a frame adapted to seat directly upon the shaft, a pair of cradles pivotally mounted upon the frame at diametrically spaced points, spring means carried by said frame opposing the movement of said cradles under centrifugal force, a centrifugal weight carried by each cradle, a sleeve adjacent one side of said frame and supported from said cradles for movement toward and from said frame, a contact-actuator slidingly mounted for movement upon said sleeve, and spring means urging said contact-actuator in one direction on said sleeve, said unit being adapted to be positioned upon a shaft as a unit.

2. In a centrifugal switch construction a unit adapted to be mounted upon a rotatable shaft, comprising a frame formed centrally with a shaft seat, a cradle pivotally mounted on said frame upon each side of said seat, a centrifugal weight carried by each cradle, spring means at the pivot point of each cradle opposing movement thereof, a sleeve aligned with the seat in said frame to slidingly enclose a shaft, links connecting said sleeve to said cradles for movement toward and from said frame upon the pivotal movement of said cradles, a ring contact-actuator slidingly mounted on said sleeve, and a coil spring encircling said sleeve and urging said contact-actuator from said frame, said unit being adapted to be mounted as a unit upon a shaft.

BROOKS L. CONLEY.